(12) United States Patent
Baumgartner et al.

(10) Patent No.: US 11,268,872 B2
(45) Date of Patent: Mar. 8, 2022

(54) METHOD FOR PRODUCING A SENSOR HOUSING FOR A FORCE OR PRESSURE SENSOR AND SENSOR HOUSING, FORCE OR PRESSURE SENSOR, AND USE OF AN ADDITIVE MANUFACTURING DEVICE

(71) Applicant: PIEZOCRYST ADVANCED SENSORICS GMBH, Graz (AT)

(72) Inventors: Martin Baumgartner, Gross St. Florian (AT); Robert Strmsek, Race (SI); Dietmar Kröger, Graz (AT)

(73) Assignee: PIEZOCRYST ADVANCED SENSORICS GMBH, Graz (AT)

( * ) Notice: Subject to any disclaimer, the term of this patent is extended or adjusted under 35 U.S.C. 154(b) by 293 days.

(21) Appl. No.: 16/471,773

(22) PCT Filed: Nov. 6, 2017

(86) PCT No.: PCT/EP2017/078277
§ 371 (c)(1),
(2) Date: Feb. 11, 2020

(87) PCT Pub. No.: WO2018/114109
PCT Pub. Date: Jun. 28, 2018

(65) Prior Publication Data
US 2020/0232862 A1    Jul. 23, 2020

(30) Foreign Application Priority Data

Dec. 20, 2016   (DE) ..................... 10 2016 225 652.1

(51) Int. Cl.
*G01L 19/00*     (2006.01)
*G01L 19/04*     (2006.01)
(Continued)

(52) U.S. Cl.
CPC .......... *G01L 19/0681* (2013.01); *G01L 9/008* (2013.01); *G01L 23/10* (2013.01); *B33Y 80/00* (2014.12)

(58) Field of Classification Search
CPC ... G01L 1/00; G01L 1/16–22; G01L 9/00–08; G01L 9/008; G01L 9/0044;
(Continued)

(56) References Cited

U.S. PATENT DOCUMENTS 4,787,250 A   11/1988  Varrese
5,503,023 A   4/1996   Benedikt et al.
(Continued)

FOREIGN PATENT DOCUMENTS

AT      407577      4/2001
CH      705261      1/2013
(Continued)

OTHER PUBLICATIONS

Official Action for German Patent Application No. 102016225652.1, dated Aug. 21, 2017, 7 pages.
(Continued)

*Primary Examiner* — Nguyen Q. Ha
(74) *Attorney, Agent, or Firm* — Sheridan Ross P.C.

(57) ABSTRACT

The invention relates to a method for producing a sensor housing for a pressure sensor and to a sensor housing for a pressure sensor, to a pressure sensor having such a sensor housing, and to the use of an additive production device for producing such a sensor housing. A sensor body and/or at least one membrane stamp is applied to a provided metal plate by means of additive production. The additive production produces an integrally joined, in particular planar joint connection between the sensor body and/or the at least one membrane stamp, on the one side, and the metal plate, on the other side.

35 Claims, 6 Drawing Sheets

(51) Int. Cl.

| | | |
|---|---|---|
| *G01L 19/14* | (2006.01) | |
| *G01L 9/00* | (2006.01) | |
| *G01L 9/08* | (2006.01) | |
| *G01L 23/10* | (2006.01) | |
| *G01L 1/00* | (2006.01) | |
| *G01L 19/06* | (2006.01) | |
| G01M 15/08 | (2006.01) | |
| B33Y 80/00 | (2015.01) | |

(58) Field of Classification Search
CPC . G01L 9/0055; G01L 19/00; G01L 19/04–06; G01L 19/0092; G01L 19/0645; G01L 19/14; G01L 23/10; G01M 15/08; B22F 10/20; B22F 2301/35; B33Y 70/00; B33Y 80/00; F02B 77/085
See application file for complete search history.

(56) References Cited

U.S. PATENT DOCUMENTS

| | | | |
|---|---|---|---|
| 2010/0058873 A1 | 3/2010 | Klopf et al. | |
| 2012/0031189 A1 | 2/2012 | Sato | |
| 2012/0137786 A1 | 6/2012 | Staiger et al. | |
| 2014/0201968 A1 | 7/2014 | Karst et al. | |
| 2016/0016229 A1 | 1/2016 | Czinger et al. | |
| 2016/0103031 A1* | 4/2016 | Tham | B28B 1/008 73/724 |
| 2016/0202101 A1* | 7/2016 | Sparks | G01F 1/8404 73/861.355 |
| 2016/0299024 A1 | 10/2016 | Yamada et al. | |
| 2017/0328796 A1* | 11/2017 | Abousaleh | G01L 7/022 |
| 2019/0360894 A1* | 11/2019 | Staiger | G01L 19/0092 |

FOREIGN PATENT DOCUMENTS

| | | | | |
|---|---|---|---|---|
| DE | 10361769 | 7/2005 | | |
| DE | 102011002596 | 7/2012 | | |
| DE | 112010000748 | 1/2013 | | |
| DE | 102014114037 | 3/2016 | | |
| DE | 102014114764 | 4/2016 | | |
| JP | S46-10238 | 3/1971 | | |
| JP | S56-104229 | 8/1981 | | |
| JP | H05-501309 | 3/1993 | | |
| JP | 2010-117346 | 5/2010 | | |
| JP | 2012-530913 | 12/2012 | | |
| JP | 2014-518383 | 7/2014 | | |
| JP | 2016-022641 | 2/2016 | | |
| JP | 2016-061707 | 4/2016 | | |
| JP | 2016-509962 | 4/2016 | | |
| JP | 2016-200527 | 12/2016 | | |
| WO | WO-2010149501 A1 * | 12/2010 | ............. | G01L 23/18 |
| WO | WO 2011/0147829 | 12/2011 | | |
| WO | WO 2014/126830 | 8/2014 | | |
| WO | WO 2015/150479 | 10/2015 | | |
| WO | WO 2016/045883 | 3/2016 | | |

OTHER PUBLICATIONS

English Translation of the International Preliminary Report on Patentability for International (PCT) Patent Application No. PCT/EP2017/078277, dated Jul. 4, 2019, 11 pages.
International Search Report prepared by the European Patent Office dated Jan. 10, 2018, for International Application No. PCT/EP2017/078277.
Official Action with machine translation for European Patent Application No. 17793956.8, dated Mar. 10, 2020, 12 pages.
Official Action with English Translation for Japan Patent Application No. 2019-534673, dated Sep. 6, 2021, 20 pages.

* cited by examiner

METHOD FOR PRODUCING A SENSOR HOUSING FOR A FORCE OR PRESSURE SENSOR AND SENSOR HOUSING, FORCE OR PRESSURE SENSOR, AND USE OF AN ADDITIVE MANUFACTURING DEVICE

CROSS REFERENCE TO RELATED APPLICATIONS

This application is a national stage application under 35 U.S.C. 371 and claims the benefit of PCT Application No. PCT/EP2017/078277 having an international filing date of 6 Nov. 2017, which designated the United States, which PCT application claimed the benefit of German Patent Application No. 102016225652.1 filed 20 Dec. 2016, the disclosures of each of which are incorporated herein by reference in their entireties.

BACKGROUND OF THE INVENTION

Field of the Invention

The present invention relates to a method for producing a sensor housing for a force or pressure sensor, particularly for use in a combustion chamber, as well as a sensor housing for a force or pressure sensor, particularly for use in a combustion chamber, a force or pressure sensor having such a sensor housing, particularly for use in a combustion chamber, and the use of an additive manufacturing apparatus for producing such a sensor housing, particularly for use in a combustion chamber.

Description of Related Art Including Information Disclosed Under 37 CFR 1.97 and 1.98

Various apparatus for detecting pressure, particularly in a combustion chamber of a reciprocating piston engine, are known from the prior art. Generally speaking, a membrane communicating with the combustion chamber absorbs the pressure under deformation. A membrane stamp, which is part of the membrane or connected to same, transmits this deformation, or the pressure proportional thereto respectively, to a pressure transducer which thereupon generates electrical signals proportional to the pressure.

DE 11 2010 000 748 T5 relates to the measuring of pressure by a one-piece pressure sensor port which has an opening connected to a membrane via a channel. The opening is thereby configured to conduct a substance through the channel toward the membrane, whereby a mechanical load is exerted on the membrane. The pressure sensor port is made from a single piece of material and has no welded seams, soldered joints or connection points.

DE 10 2011 002 596 A1 relates to a combustion chamber pressure sensor comprising a housing with a housing opening which is sealed by at least one membrane. The membrane can thereby be integrally formed with the housing or bonded to the housing in the area of the at least one housing opening by means of at least one fixation, for example a force-fit and/or form-fit connection and/or a material bond, for example a welded joint. A mechanical-electrical transducer element configured to record pressure in a combustion chamber transmitted by a push rod is accommodated in an interior space.

CH 705 261 A1 relates to a method for connecting a membrane to a housing of a pressure or force sensor, wherein a first connection is initially made between a housing ring surface and a membrane ring surface in an inner region and then a second connection is made between the housing ring surface and a membrane ring surface. The first connection can be a soldered joint, a brazed joint, a welded joint, a resistance welded joint, a bonded joint or a thermal compression bonded joint. The second connection can be a laser welded joint, an electron beam welded joint, a joint welded pursuant to the argon arc method, a tungsten inert gas welded joint, a protective gas welded joint or a bonded joint.

In summary, in particular used in the manufacturing processes of known sensor housings are "traditional" separating and/or joining processes such as drilling, turning, milling, welding and/or bonding, etc.

WO 2016/045883 A1 relates to a method for producing a customer-specific component of a field device for determining or monitoring at least one process variable of a medium, whereby the field device is used in an automation process, wherein the component is produced from at least one material, wherein the material and the structure and/or shape of the component are specified by digital description data, and wherein the component is produced in a 3-D printing method in accordance with the specified digital description data.

BRIEF SUMMARY OF THE INVENTION

It is a task of the invention to specify a simple and flexible method for producing a sensor housing for a pressure sensor as well as an improved sensor housing and the use of an additive manufacturing apparatus in the simple production of a sensor housing, whereby in particular the limitations of traditional separating and joining processes are avoided.

This task is solved by the method for producing a sensor housing for a force or pressure sensor, particularly for use in a combustion chamber, in accordance with claim 1, the sensor housing, particularly for use in a combustion chamber, in accordance with claim 5, the force or pressure sensor, particularly for use in a combustion chamber, in accordance with claim 20, as well as the use of an additive manufacturing apparatus according to claim 22.

Advantageous embodiments of the invention are claimed in the dependent claims. The teaching of the claims is hereby made a part of the description.

A first aspect of the invention relates to a sensor housing, particularly for use in a combustion chamber, for a force or a pressure sensor (1) having a metallic sensor body and a metal sheet. The metal sheet closes off the sensor body preferably on one side. Further preferably, the sensor body is applied to the metal sheet by additive manufacturing and connected to the metal sheet by an in particular planar integral joint produced during the additive manufacturing and the metal sheet forms an in particular annular membrane in a region bounded by the sensor body.

Preferably, the sensor housing comprises at least one metallic membrane stamp in contact with the metal sheet, wherein the membrane is formed between the sensor body and the membrane stamp.

Further preferably, the membrane stamp is applied to the metal sheet by additive manufacturing and connected to the metal sheet by an in particular planar, integral joint produced during the additive manufacturing.

A second aspect of the invention relates to a pressure sensor, particularly for use in a combustion chamber, having a sensor housing according to the first aspect of the invention.

A third aspect of the invention relates to a method for producing a sensor housing, particularly for use in a combustion chamber, of a force or pressure sensor, wherein a metal sheet is provided and a sensor body and/or at least one membrane stamp is applied to the metal sheet by means of additive manufacturing. The additive manufacturing thereby produces an integral, in particular planar joint between the sensor body and/or the at least one membrane stamp on the one hand and the metal sheet on the other.

A fourth aspect of the invention relates to the use of an additive manufacturing apparatus for producing a sensor housing of a pressure sensor, particularly for use in a combustion chamber, according to the second aspect of the invention.

Any reference made to a pressure sensor in the following will also always mean a force sensor, particularly a structurally identical force sensor.

A sensor body in the sense of the invention is a part of a sensor housing supporting at least the membrane. The sensor body thereby limits an area representing an inner area of the sensor body. In particular, a sensor body spans at least one opening which faces or can face a pressure chamber, in particular a combustion chamber of a reciprocating piston engine, and is preferentially closed or to be closed by the membrane. Preferably, at least sections of the sensor body exhibit the form of a hollow cubic block or hollow cylinder which, further preferably, is open at least at one of the sides. Further preferably, the sensor body is configured to accommodate at least part of a membrane stamp and at least part of a pressure transducer, in particular a piezoelectric element, in its interior or spanned inner area through the hollow cubic block or hollow cylinder respectively.

A membrane stamp in the sense of the invention is a region within which a membrane is reinforced. The membrane stamp can thereby be formed by the membrane itself or by a further element. Preferably, the membrane cannot be deformed in the area of the membrane stamp by the expected pressures of a pressure sensor.

A metal sheet in the sense of the invention is in particular to be understood as a flat or thin substantially planar metal piece. Preferably, the metal sheet exhibits a circular form, whereby its diameter preferably corresponds to a diameter of the in particular likewise circular sensor body configured as a hollow cylinder. Preferably, the metal sheet can be a metal foil.

Additive manufacturing in the sense of the invention relates to the producing of an in particular three-dimensional workpiece from one or more raw materials, particularly metal particulates, metal powder, metal granulate or metal wire. Preferably, the raw material is thereby sequentially heated or cured, in particular melted on or fused, point by point by one or more production blasts, particularly at spatially high resolution, whereby a single solid body forms during the subsequent solidification or hardening. Further preferably, the heating is effected by one or more focused laser or electron beams. The raw material is thereby preferentially deposited and processed in layers so that the workpiece is created piece by piece; layer by layer. Doing so can thus advantageously produce workpiece structures which are unable to be realized with traditional separating processes such as for instance drilling or milling. This relates in particular to both the shaping of the workpieces as well as the degree of detail; i.e. the spatial resolution.

Additive manufacturing methods are also called generative manufacturing and relate in particular to the primary forming of a workpiece to be produced.

A planar integral joint in the sense of the invention is in particular to be understood as a connection between at least two elements which continuously connects the two elements together, at least however at multiple, in particular a plurality of connecting points. The connecting points can thereby also be microscopic or mesoscopic; i.e. exhibit a microscopic or mesoscopic spatial expansion. In particular, the connecting points can thereby be arranged in a substantially regular pattern or be irregularly arranged. Neither the distribution nor the spatial expansion of the connecting points thus needs to be homogeneous; i.e. the connecting points can be formed or respectively arranged small and close together in one area of the connection while large and far apart in another area.

A combustion chamber in the sense of the invention is preferably a closed space in which a combustible working medium, for instance a gas or a powder, is burned in particular as part of an operating cycle. The combustion can thereby in particular ensue explosively or by means of an open flame. Preferentially to be understood by a combustion chamber is a combustion chamber of an internal combustion engine, in particular a reciprocating piston engine. A combustion chamber can however also be advantageously configured as a combustion chamber of a gas turbine or jet engine, a combustion chamber in particular of a steam engine, or a firing chamber particularly of a thermal power station.

The invention is based in particular on the approach of applying an in particular metallic sensor body and/or an in particular metallic membrane stamp onto a provided metal sheet. In particular, the sensor body and/or the membrane stamp are produced directly on the metal sheet, for instance by additive manufacturing. In other words, a primary forming of the sensor body and/or membrane stamp directly on the metal sheet occurs. Thus, an integral, in particular planar, joint is produced between the sensor body and/or membrane stamp on the one hand and the metal sheet on the other. Preferably, the metal sheet, in particular its surface, is thereby connected to the material, in particular metal, from which the sensor body and/or the membrane stamp additive is/are additively manufactured. The metal sheet thus forms a membrane between the sensor body and the membrane stamp having advantageous elastic properties. In particular, the metal sheet forms a membrane, its surface remaining at least substantially constant even during deformation, in particular deflection, so that the deformation of the membrane is and/or remains at least substantially proportional to an acting pressure in a pressure chamber, in particular combustion chamber of a reciprocating piston engine. In particular, a pressure/force ratio of the membrane remains at least substantially constant. The pressure measurement by the sensor is thus particularly reliable.

Welding seams can furthermore be completely or at least to a large extent dispensed with, whereby in particular the elastic properties of the membrane are positively influenced or at least not influenced, particularly not negatively influenced. Particularly prevented is one or more welding seams causing a deformation and/or a warping and/or a distorting of the sensor body from heating or by material constricting or material properties changing during the welding process respectively. Moreover, the integral, in particular planar, joint seals an inner space of the sensor body, in which in particular a pressure transducer is arranged for converting the pressure recorded by the membrane stamp into electrical signals, against the outer pressure chamber in particularly reliable gas-tight manner.

The inventive manufacturing process for a sensor housing and the innovative sensor housing can in particular overcome the limitations of traditional separating and/or joining processes, particularly in terms of the forming and/or degree of detail in separating processes and/or the influencing of elastic properties in joining processes, at least in the region of the membrane.

Preferably, the metal sheet exhibits a thickness of approximately 0.05 mm to 0.3 mm, preferentially approximately 0.075 mm to 0.2 mm, in particular approximately 0.1 mm. The sensor body and/or the membrane stamp can thus be reliably applied to the metal sheet by additive manufacturing, whereby the metal sheet forms a particularly flexible membrane between the sensor body and membrane stamp. Preferably, the membrane deforms or respectively moves, particularly in an area on the membrane stamp, by about 3 to 15 μm, preferentially about 4 to 10 μm, in particular approximately 4.5 μm, when absorbing a pressure. In particular, the deflection of the membrane stamp by the deforming/moving membrane thereby preferably amounts to about 3 to 15 μm, preferentially about 4 to 10 μm, in particular approximately 4.5 μm.

Overall, the invention allows the simple and flexible connecting of a sensor body and/or a membrane stamp to a metal sheet so that a particularly gas-tight sensor housing is produced at least relative to a pressure chamber, in particular a combustion chamber, the membrane of which has advantageous elastic properties.

Preferably, the pressure sensor or sensor housing or sensor body or membrane stamp respectively exhibits a longitudinal axis. Accordingly, the following will refer to directions along the longitudinal X axis as "axial directions" and directions perpendicular to the longitudinal X axis as "radial directions." The pressure sensor or sensor housing or sensor body or membrane stamp respectively is or is to be of preferentially at least substantially rotationally symmetrical configuration with respect to the longitudinal axis.

In one preferential implementation, the in particular provided metal sheet is produced by a separating or a forming process, in particular by turning or forging. Preferably, the metal sheet comprises the membrane stamp. In particular, the metal sheet is integrally formed with the membrane stamp, in particular by means of a separating process, particularly preferentially by turning or electrochemical machining (ECM).

In a further preferential development, the metal sheet is at least partially melted onto particularly at least one surface during the additive manufacturing. Preferably, this is effected by one or more, in particular focused, laser or electron beams, which scan the metal sheet in particular on at least one surface. The raw material, in particular metal, preferentially likewise melted by the laser or electron beam, from which the sensor body and/or the membrane stamp is/are produced, can thereby particularly advantageously bond to the metal sheet when cooling or respectively solidifying. In particular, an integral, in particular planar, joint is thereby produced between the sensor body and/or membrane stamp on the one hand and the metal sheet on the other. This ensures an extremely reliable gas-tightness of the connection and does not compromise the elastic properties of a membrane formed between the sensor body and the membrane stamp.

In a further preferential implementation, the external sides of the sensor body and/or the membrane stamp are produced, in particular connected to the metal sheet, at a higher resolution; i.e. a higher degree of detail, in the additive manufacturing than in the volume or respectively region limited by the external sides. The efficiency of the additive manufacturing can thereby be increased.

In a further preferential implementation, at least one, in particular spiral, cavity is formed in the sensor body and/or membrane stamp during the additive manufacturing. Preferably formed is a cavity adapted to a shape of the sensor body and/or membrane stamp. The cavity can fulfill different functions, serving or respectively configured as a cooling duct, to save on material, for providing predetermined elastic properties, as an inlet for a working medium and/or as accommodation for further components of the sensor housing or pressure sensor respectively. In one implementation, the cavity is configured as a recess or blind hole respectively. In an alternative implementation, the cavity is completely closed. The additive manufacturing enables the particularly simple forming of such a cavity, particularly in the course of the additive manufacturing of the sensor body and/or membrane stamp. In particular, the cavity can also be formed such that it cannot be produced by traditional separating methods, in particular drilling and/or milling.

In a further preferential implementation, residues produced during the additive manufacturing are removed from the at least one cavity via a bore or an access channel formed during the additive manufacturing, in particular by rinsing or blowing. The access channel can thereby be spiral, in particular adapted to the shape of the sensor body and/or membrane stamp. This thus ensures a reliable removal of the residues. Preferably, after the residues have been removed, the access channel can be used as a supply and/or discharge line, in particular for a coolant, particularly during operation of the pressure sensor.

In a further preferential implementation, the metal sheet on the one hand and the sensor body and/or at least one membrane stamp on the other hand can comprise different materials. Preferably, the sensor body and/or the at least one membrane stamp is made of a rigid durable material so as to prevent deformations and/or be able to communicate acting forces, in particular recorded pressure, without loss, particularly to a pressure transducer. Alternatively or additionally, the metal sheet is made of a flexible elastic material so that an elastic membrane, in particular with particularly advantageous elastic properties, which is or can be deformed or respectively deflected in proportion to an applied pressure, can be formed between the sensor body and the at least one membrane stamp.

In a further preferential implementation, the metal sheet comprises at least two different materials. Preferably, the metal sheet is coated, in particular with a film. Further preferably, the coating is designed to insulate or respectively dissipate heat, particularly from a combustion chamber of a reciprocating piston engine, acting on an area of the membrane so as to prevent or at least minimize a deforming/changing of the membrane's elastic properties due to heat exposure.

In a further preferential implementation, the metal sheet comprises a rigid section in the at least one area where it connects to the sensor body and/or the membrane stamp by means of an integral joint and a flexible section in the area of the membrane. This thus enables the metal sheet to be particularly reliably bonded to the sensor body and/or the membrane stamp, in particular without distortion, whereby it nevertheless exhibits very good elastic properties for accommodating pressure in the area of the membrane.

Preferably, the metal sheet comprises a rigid material and/or has a first sheet thickness in the at least one area where it connects to the sensor body and/or membrane stamp by means of an integral, in particular planar, joint. Further preferably, the metal sheet comprises an elastic material and/or has a second sheet thickness in the area of the membrane, whereby the first sheet thickness is thicker than the second sheet thickness. Preferentially, the rigid material and the elastic material and/or the first sheet thickness and the second sheet thickness continually give way into one another. In other words, the concentration of the rigid material and/or the sheet thickness in the area of the integral joint with the sensor body and/or membrane stamp increases while the concentration of the elastic material decreases. Inversely, the concentration of the rigid material and/or the sheet thickness in the area of the membrane decreases while the concentration of the elastic material increases. As a result, particularly advantageous elastic properties of the metal sheet can be effected. Particularly prevented is the proliferation of distortions or warping occurring in the area of the integral joint or in the area of the membrane, in particular in the membrane. In particular, a pressure/force ratio of the membrane is kept constant.

In a further preferential implementation, the metal sheet is at least partly of waved, curved or ached configuration particularly substantially in a radially extending plane, particularly in an area of the membrane, and thereby adapted to expand upon absorption of heat of substantially equal parts on both sides of the plane in the axial direction. In particular, the waved, curved or ached shaped regions of the metal sheet are configured to absorb heat or, respectively, deform particularly in the axial direction when absorbing heat. This thus prevents the metal sheet from deforming out of the radial plane, in particular a deflection of the membrane stamp bonded to the metal sheet.

In a further implementation, the sensor body and/or the membrane stamp comprise at least one cooling duct which is formed during the additive manufacturing of the sensor body and/or the membrane stamp. It is particularly simple to exclude predetermined areas of the sensor body and/or the membrane stamp from the production blast processing during the additive manufacturing so as to produce corresponding cavities. A coolant flowing through these cavities, in particular the cooling ducts, can advantageously prevent or at least minimize an increase in the temperature of the sensor housing by dissipating the heat generated in particular by the processes within a combustion chamber of a reciprocating piston engine. This thereby ensures that the membrane's deformation, in particular deflection, remains proportional to the recorded pressure.

In a further preferential implementation, the at least one cooling duct is configured in correspondence with a shape of the sensor body, in particular circular, and preferably runs at least substantially parallel to the metal sheet. In particular, the at least one cooling duct runs circularly around the membrane formed by the metal sheet. Heat conducted in particular by a coating of the material sheet can thereby be particularly reliably dissipated by a coolant flowing through the at least one cooling duct. This implementation cannot be achieved, or at least only achieved with a great deal of effort, with traditional separating processes, in particular drilling and/or milling.

In a further preferential implementation, the at least one cooling duct runs in a spiral within the sensor body. Heat can thereby be expelled from a particularly large volume and the temperature in particular in an interior of the sensor body particularly reliably regulated.

In a further preferential implementation, the sensor housing comprises a thermal protection element which is integrally bonded to the sensor body and/or membrane stamp by additive manufacturing and arranged on a side of the sensor body and/or the membrane stamp and/or the membrane able to face a pressure chamber. The additive manufacturing enables the thermal protection element to be materially bonded to the sensor body and/or the membrane stamp in particular without a welded seam which would negatively impact the elastic properties of the membrane. Cavities can thereby also be realized in a thermal protection element otherwise closed to the exterior. Preferentially, the thermal protection element is configured as an outer pressure chamber-side skin of the sensor body and/or the membrane stamp and/or the membrane.

Preferably, the thermal protection element is configured to absorb and/or dissipate the heat which develops during processes within a combustion chamber, particularly a combustion chamber of a reciprocating piston engine, and thereby prevent or at least minimize the effect of the heat particularly on the membrane. Further preferably, the thermal protection element is designed and/or configured, in particular formed, to expand along its surface, in particular in the radial direction, when exposed to heat, for instance upon a thermal shock. Alternatively or additionally, the thermal protection element is designed to expand perpendicular to its surface, in particular in the axial direction. The thermal protection element is preferentially also designed to absorb or respectively dissipate the heat and/or expand along its surface, in particular radially, and/or perpendicular to its surface, in particular axially, also upon a sudden particularly non-linear exposure to heat, for instance upon thermal shock.

As defined by the invention, a thermal shock relates to the rapid shock-like effect of thermal energy, in particular heat, on a workpiece. If no suitable precautions are taken, the temperature of the workpiece thereby likewise increases rapidly or in shock-like manner respectively, in particular non-linearly, which can in particular lead to mechanical stressing and/or distortions and/or (elastic) deformations of the workpiece. Thermal shock is for instance caused by the combustion of a fuel in a combustion chamber of a reciprocating piston engine.

The thermal protection element is preferentially materially bonded to the sensor body and/or the membrane stamp such that an expansion of the thermal protection element along its surface, particularly in the radial direction, causes no distortions or warping in the sensor body and/or the membrane stamp. In particular, the thermal protection element is preferably connected in the radial direction to at least one pressure chamber-side projection of the sensor body and/or membrane stamp which projects in particular into the pressure chamber. Further preferably, the connection to the sensor body and/or membrane stamp is configured symmetrically with respect to the at least one projection of the sensor body and/or the membrane stamp. Transmission of thermally-induced deformations of the thermal protection element to the sensor body and/or the membrane stamp, in particular a heat-related movement of the membrane stamp, is thus particularly reliably prevented.

In a further preferential implementation, the thermal protection element exhibits slots and/or holes through which pressure can act or a pressure wave can spread. Preferably, one side of the thermal protection element is thereby arranged on a side of the sensor body and/or the membrane stamp and/or the membrane facing a pressure chamber and spans the radial cross section of the sensor body and/or membrane stamp and/or membrane. This thereby in particular reliably prevents or at least minimizes heating of the sensor body and/or membrane stamp and/or membrane, particularly a heat-related movement of the membrane stamp.

In a further preferential implementation, the thermal protection element is materially and/or thermoconductively connected to the sensor body and/or the membrane stamp by means of preferably flexible, in particular additive-manufactured, connecting means. Preferably, the connecting means are configured in particular as thin webs and/or bars and/or trusses. Further preferably, the connecting means are configured to distance the thermal protection element from the sensor body and/or membrane stamp and/or membrane and/or support the thermal protection element. As a result, the thermal protection element as described above in the embodiments functions particularly reliably.

Preferentially, the flexible connecting means are defined during the additive manufacturing by cavities arranged between the connecting means. The connecting means can thus be arranged according to structural or respectively functional aspects. In particular, the limitations of traditional production methods, particularly drilling and/or milling, play no role in the arrangement of the connecting means.

In a further preferential implementation, the thermal protection element is a part of the sensor body and/or the membrane stamp and is preferentially defined via at least one cavity in the sensor body and/or the membrane stamp. Preferably, the thermal protection element is defined by a plurality of cavities arranged between the connecting means or delimited from the sensor body and/or the membrane stamp respectively. The thermal protection element can thus be particularly easily produced in the course of additive manufacturing, in particular when the sensor body and/or the membrane stamp is applied to the metal sheet.

In a further preferential implementation, the flexible connecting means can be configured to dissipate heat absorbed by the thermal protection element via the sensor body and/or the membrane stamp. This can thus reliably prevent a deformation of the thermal protection element when exposed to heat which would impact the sensor body and/or the membrane stamp and/or the membrane, in particular their deformation and/or warping and/or distortion and/or movement. Particularly preferentially, the heat dissipated to the sensor body and/or membrane stamp is absorbed and dissipated by a coolant in a cooling duct.

In a further preferential implementation, the membrane together with at least one section of the sensor body forms a thermal protection element, moreover wherein the sensor housing further comprises a supporting structure, and wherein the metal sheet is operatively connected to the supporting structure, particularly in the region of the membrane, by means of in particular additive-manufactured, preferably rigid connecting means or by means of a coupling medium. Preferably, the rigid connecting means are configured in particular as thin bars and/or webs and/or trusses and designed to d distance the thermal protection element from the metal sheet and/or support the thermal protection element. Further preferably, the coupling medium and/or the rigid connecting means are of thermally non-conductive, in particular thermally insulating, configuration so that a flow of heat from the thermal protection element particularly to the metal sheet and the associated change in the pressure/force ratio of the membrane is reliably prevented. However, the operative connection will transmit a movement of the membrane to be applied as resulting from a force or pressure applied to the membrane to the supporting structure The additive manufacturing enables the thermal protection element to be materially bonded to the sensor body and/or the membrane stamp particularly without a welding seam, which would negatively impact the elastic properties of the membrane. Preferably, the metal sheet has a lower membrane thickness than the supporting structure so that the membrane absorbs more acting heat than the supporting structure and, in particular when exposed to heat, for instance from thermal shock, more rapidly and/or more easily deforms. An effect of heat on the supporting structure can thus be reliably prevented. Furthermore, the thermal protection element configured as a membrane can deform more easily without producing warping and/or distortions in the supporting structure, particularly via rigid connecting means, or a movement of the membrane stamp connected to the membrane.

In a further preferential implementation, an operative connection acts exclusively in the radial direction; i.e. substantially perpendicular to a longitudinal axis of the sensor housing. Preferably, the thermal protection element can thereby deform when absorbing heat, particularly from a thermal shock, without thereby effecting deformation of the elements connected to the thermal protection element by rigid connecting means, in particular the metal sheet or the membrane and/or sensor body respectively.

Further preferably, the thermal protection element is configured to deform in waves or curves when absorbing heat, in particular from a thermal shock, whereby the rigid connecting means are preferentially arranged at crosspoints of the waved or curved-deformed thermal protection element.

In a further preferential implementation, the supporting structure is in contact with the membrane stamp. Momentum can thereby be transmitted from the membrane to the membrane stamp via the supporting structure. Preferably, a deformation, in particular deflection, of the membrane acts on the stamp in the axial direction. In particular, a deformation, in particular deflection, causes an corresponding deflection of the membrane stamp.

In a further preferential implementation, the sensor body and/or the membrane stamp (4) are applied to supporting structure (17) by additive manufacturing and connected to supporting structure (5) by an in particular planar integral joint (9) produced during the additive manufacturing. Preferably, the further membrane is thereby bonded at least on one side to the sensor body and/or the membrane stamp by an integral, in particular planar, joint.

In a further preferential implementation, the coupling medium is designed to absorb heat absorbed by the thermal protection element, in particular from a thermal shock, and transmit it particularly such that the metal sheet, in particular the membrane, preferentially in contact with the coupling medium accordingly deforms the supporting structure, in particular mirror-symmetrically. In other words, the membrane and supporting structure deform in opposite directions. Due to the preferential integral joint with the membrane stamp, forces acting on the membrane stamp due to the deformation thereby cancel each other out, particularly in the axial direction, so that a heat-related movement of the membrane stamp is prevented.

In a further preferential implementation, the metal sheet and/or the supporting structure closes the sensor housing, in particular the sensor body, so as to be gas-tight. This thus ensures that pressure acting on the metal sheet and/or the supporting structure is completely or at least virtually completely absorbed by same and preferentially converted to a deformation or deflection respectively.

In a further preferential implementation, the sensor housing comprises at least two membrane stamps and at least one further pressure transducer, whereby the metal sheet forms at least two, in particular annular, membranes between the sensor body and the at least two membrane stamps. Preferably, the sensor body is formed by additive manufacturing such that the at least two membrane stamps and the corresponding number of pressure transducers can be arranged next to each other even in the smallest space, for instance in a drill hole in a combustion chamber of a reciprocating piston engine or in a cylinder head. Preferentially, the sensor body is miniaturized by means of additive manufacturing in such a manner that makes comparable manufacturing using traditional separating processes, in particular boring and/or milling and/or turning, impossible. The at least two membrane stamps and the appropriate number of pressure transducers can particularly reliably detect a pressure, particularly in the combustion chamber of a reciprocating piston engine, since the respective pair of membrane stamp and pressure transducer can perform redundant measurements and the respective measurement results thus adjusted and/or verified.

In a further preferential implementation, the metal sheet exhibits heat-conducting and/or reinforcing, in particular additively manufactured, membrane structures in the region of the membrane which are materially connected to the metal sheet by an integral joint produced during the additive manufacturing. Preferably, the membrane structures are radially arranged in circular or at least circular-segmented, wave-like, fan-like and/or zigzag form or in other geometry or even randomly arranged. The membrane structures in these arrangements can thus exhibit both different as well as also one or more predetermined lengths. Preferentially, the membrane structures are configured to absorb heat absorbed by the metal sheet, in particular from a coating of the metal sheet, and conduct it in particular to an outer edge of the metal sheet, in particular the membrane formed by the metal sheet, particularly preferentially to a thermal protection element and/or a cooling duct, whereby a deformation and/or distortion and/or warping of the membrane, in particular a movement of the membrane stamp connected to the membrane, is prevented. Preferably, the membrane structures are thereby not of rotationally symmetrical configuration.

In a further preferential implementation, the sensor housing exhibits an angular, in particular rectangular or square, cross section in the axial direction, wherein the membrane at least substantially exhibits the form of the cross section.

The surface of the membrane and thus the sensitivity of the sensor in different mounting situations can thereby be significantly improved.

In a further preferential implementation, the metal sheet exhibits, at least in the region of the membrane, a curvature which is not rotationally symmetrical particularly with respect to a longitudinal axis of the sensor housing.

Because of the curvature, the surface to the space to be measured can be adapted to the contour of the surrounding area, for example the progression of a combustion chamber wall.

The properties and advantages outlined above with respect to the first aspect of the invention also apply analogously to the second, third and fourth aspect of the invention, provided technically feasible, as well as vice versa.

BRIEF DESCRIPTION OF THE SEVERAL VIEWS OF THE DRAWINGS

The invention will be described in greater detail in the following on the basis of non-limiting exemplary embodiments as depicted in the figures. Shown therein at least to some extent schematically.

DETAILED DESCRIPTION OF THE INVENTION

Figure 1:
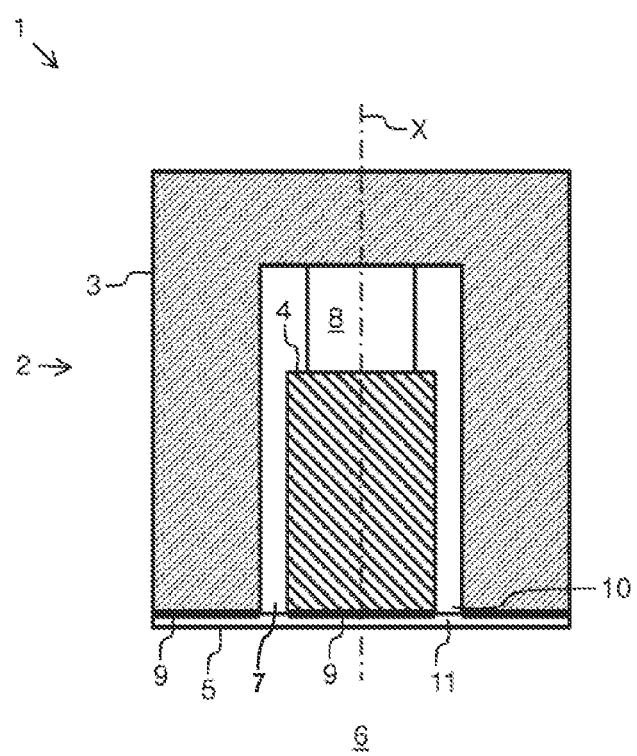
FIG. 1 a pressure sensor having a first exemplary embodiment of an inventive sensor housing in cross section.

FIG. 1 shows a first exemplary embodiment of a pressure sensor 1 having an inventive sensor housing 2, in particular for use in a combustion chamber.

The pressure sensor 1 exhibits a sensor housing 2 having a sensor body 3 and a membrane stamp 4. The sensor body 3 and the membrane stamp 4 are produced or respectively formed by means of additive manufacturing on a metal sheet 5 which closes an opening 10 of the sensor body 3 facing a pressure chamber 6, in particular a combustion chamber. A pressure transducer 8 is arranged inside the sensor housing 2 and in particularly operatively connected to the membrane stamp 4 such that pressure recorded by the membrane stamp 4, as described in detail further below, can be converted into electrical signals by the pressure transducer 8.

The pressure sensor 1 preferably exhibits a longitudinal axis X. Correspondingly, the following will refer to directions along the longitudinal X axis as "axial directions" and directions perpendicular to the longitudinal X axis as "radial directions," even if the longitudinal axis X is not explicitly plotted.

The sensor housing 2, in particular the sensor body 3 and/or the membrane stamp 4 and/or the metal sheet 5, is preferably substantially rotationally symmetric with respect to the longitudinal axis X. Alternatively, however, the sensor housing and the metal sheet may exhibit no symmetry at all or another symmetry, for example mirror symmetry with respect to a plane.

Preferably, the sensor body 3 and the membrane stamp 4 are applied to the metal sheet 5 by means of additive manufacturing. In particular, first the metal sheet 5 is provided and a layer of raw material, for instance metal particulates, is deposited on the metal sheet. One or more production blasts, in particular laser or electron beams, heat, in particular melt, the raw material layer at predetermined points. In particular, the predetermined points are sequentially traversed; i.e. scanned. Preferably, the surface of the metal sheet 5 is thereby also at least partially melted on or fused, particularly at the predetermined points. When curing, the raw material layer materially bonds to the metal sheet 5 at these points, in particular in planar fashion. This integral planar joint is identified in FIG. 1 by the black bars having the reference numeral of 9. Further raw material layers can subsequently be gradually deposited and fused to the respective already cured underlying layer in the production blast(s).

Preferably, the sensor housing 2 comprises a gap 7 between the membrane stamp 4 and the sensor body 3 in a sensor body 3 and membrane stamp 4 produced as such. In the area which limits the gap 7 to the pressure chamber 6, in particular in the region of the opening 10 of the sensor body 3, the metal sheet 5 forms an in particular flexible or respectively elastic membrane 11. The membrane 11 is therefore bounded on the outside by the sensor body 3 and on the inside by the membrane stamp 4 and thus of annular configuration.

The membrane 11 is designed to absorb pressure from the pressure chamber 6, in particular a combustion chamber, by deforming, in particular deflecting. The deformation, in particular deflection, of the membrane 11 transfers to the membrane stamp 4 connected to the membrane by the bonded joint 9. The metal sheet 5, or membrane 11 respectively, are configured such that upon pressure acting on membrane 11, the membrane stamp 4 is deflected preferably about 2-6 μm, preferentially about 4-5 μm, in particular approximately 4.5 μm. The deflection of the membrane 11, or membrane stamp 4 respectively, is thereby at least substantially proportional to the acting pressure.

The membrane stamp 4 is thereby designed to pass the recorded pressure on to the pressure transducer 8 or, respectively, transmit or transfer same to it. The pressure transducer 8 can thus produce an electrical signal proportional to the pressure in the pressure chamber 6, particularly in a combustion chamber. Preferably, the pressure transducer 8 is designed as a piezoelectric element which generates an electrical voltage subject to the acting pressure or, respectively, the resulting compression or decompression.

Figure 2:
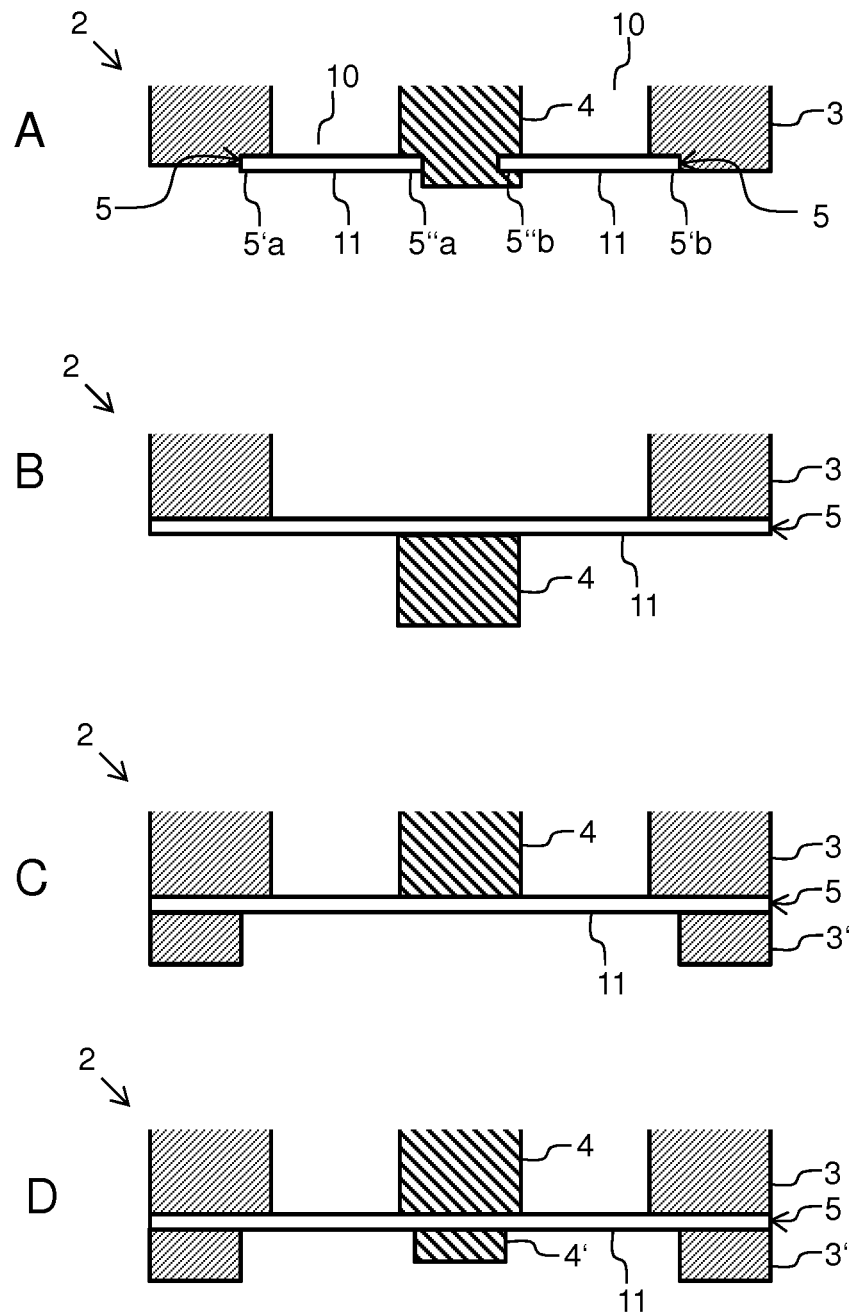
FIG. 2 partial views of several arrangement examples of a metal sheet and/or a sensor body and/or a membrane stamp in cross section.

FIG. 2 shows several arrangement examples of a metal sheet 5 and/or a sensor body 3 and/or a membrane stamp 4 of the sensor housing according to the first exemplary embodiment.

FIG. 2A shows part of a sensor housing 2 in which the metal sheet 5 is of annular configuration. The difference between the outer circular diameter and the inner circular diameter is thereby substantially equal to, in particular only slightly larger than, the width of the gap 7 between the sensor body 3 and the membrane stamp 4. A first outer edge 5'a and a second outer edge 5'b of the metal sheet 5 and a first inner edge 5"a and a second inner edge 5"b of the metal sheet 5 can thereby be attached or respectively connected to the sensor body 3 and/or membrane stamp 4 in different ways, in particular different geometries. The following describes four exemplary embodiments of the connecting geometry.

In the first exemplary embodiment of the connecting geometry, the sensor body 3 exhibits a riser at the opening 10 on an inner side facing the membrane stamp 4 against which the first outer edge 5'a abuts. The riser is thereby of shallower configuration than the thickness of the metal sheet 5 so that a part of the metal sheet 5 axially protrudes from the sensor body 3. Preferably, the metal sheet 5, in particular first outer edge 5'a, is materially and flatly bonded to the sensor body 3 along the contour of the riser.

In the second exemplary embodiment of the connecting geometry, the membrane stamp 4 has a riser at a side facing the opening 10 against which the first inner edge 5"a abuts. The riser is thereby of deeper configuration than the thickness of the metal sheet 5 so that a part of the metal stamp 4 forms a pressure chamber-side projection, in particular projecting into the pressure chamber 6. Preferably, the metal sheet 5, in particular first inner edge 5"a, is materially and flatly bonded to the membrane stamp 4 along the contour of the riser.

In the third exemplary embodiment of the connecting geometry, the membrane stamp 4 exhibits a recess at a side facing the opening 10 which accommodates the metal sheet 5, in particular the second inner edge 5"b, particularly in a positive fit. In this embodiment as well, a part of the membrane stamp 4 forms a pressure chamber-side projection and/or projects into the pressure chamber 6. Preferably, the metal sheet 5, in particular the second inner edge 5"b, is materially and flatly bonded to the membrane stamp 4 along the contour of the recess.

In the fourth exemplary embodiment of the connecting geometry, the sensor body 3 exhibits a riser at an inner side facing the opening 10 against which the second outer edge 5'b abuts. The riser is thereby configured just as deep as the metal sheet 5 is thick so that on the side facing the pressure chamber 6, the sensor body 3 is flush with the metal sheet 5. Preferably, the metal sheet 5, in particular second outer edge 5'b, is materially and flatly bonded to the sensor body 3 along the contour of the riser.

It should be noted that these four embodiments are interchangeable or can be combined with one another respectively.

FIG. 2B shows part of a sensor housing 2, in particular for use in a combustion chamber, in which the membrane stamp 4 is applied to the opposite side of the metal sheet 5 from the sensor body 3 such that the membrane stamp 4 forms a pressure chamber-side projection, in particular projects into the pressure chamber 6, in particular a combustion chamber. From the technical manufacturing perspective, this can be achieved by the sensor body 3 first being applied to the metal sheet 5, turning the metal sheet 5 materially and flatly bonded thereon to the sensor body 3, and thereafter applying the membrane stamp 4 to the metal sheet 5. In this embodiment, the pressure transducer is also not arranged inside the sensor body 3 but rather operatively connected to the membrane stamp 4 on the pressure chamber side.

FIG. 2C shows part of a sensor housing 2 in which the sensor body 3 continues in an extension 3' on the side of the metal sheet 5 facing the pressure chamber 6. In particular, the extension 3' of the sensor body 3 extends at least partly into the pressure chamber 6. From the technical manufacturing perspective, this can also be achieved by a turning or rotating of the metal sheet 5 during the additive manufacturing process.

In particular, the metal sheet 5 can also be of shorter configuration than the sensor body 3. In this case, the extension 3' of the sensor body 3 can be configured around the metal sheet 5 and directly connected to the sensor body 3 in the additive manufacturing process.

FIG. 2D shows part of a sensor housing 2 in which both the sensor body 3 as well as the membrane stamp 4 continue as respective extensions 3', 4' on the side of the metal sheet 5 facing the pressure chamber 6. In particular, the extension 3' of the sensor body 3 and the extension 4' of the membrane stamp 4 extend at least partly into the pressure chamber 6. As depicted in FIG. 2D, the parts of the sensor body 3 and the membrane stamp 4 facing the pressure chamber 6 can differ in shape and size, in particular extend to differing distances into the pressure chamber 6.

Figure 3:
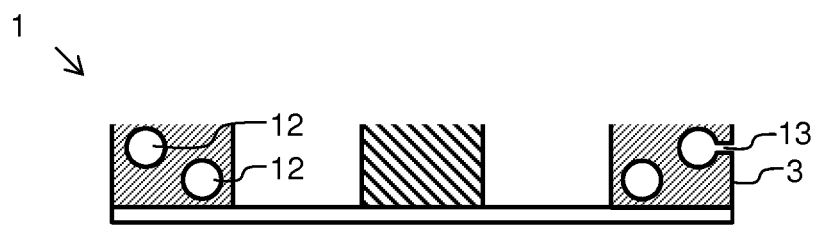
FIG. 3 a partial view of a second exemplary embodiment of an inventive sensor housing in cross section.

FIG. 3 shows a second exemplary embodiment of an inventive sensor housing 2, in particular for use in a combustion chamber, in a partial view.

In this exemplary embodiment, the sensor body 3 comprises cooling ducts 12 running circularly within the sensor body 3; i.e. in correspondence with its shape. The cooling ducts 12 are easily realized during the additive manufacturing of the sensor body 3 by the production blast(s) not processing the raw material at the locations of the cooling ducts.

The raw material thereby remaining in the cooling ducts 12 can be removed through an access channel 13, in particular blown or rinsed out, after the sensor body 3 is produced. The access channel 13 can thereby be produced directly during the additive manufacturing of the sensor body 3 or subsequently, for instance by means of a drilling. Preferably, the access channel 13 also serves as a coolant inlet via which a coolant can be conducted into or out of the cooling ducts 12.

Figure 4:
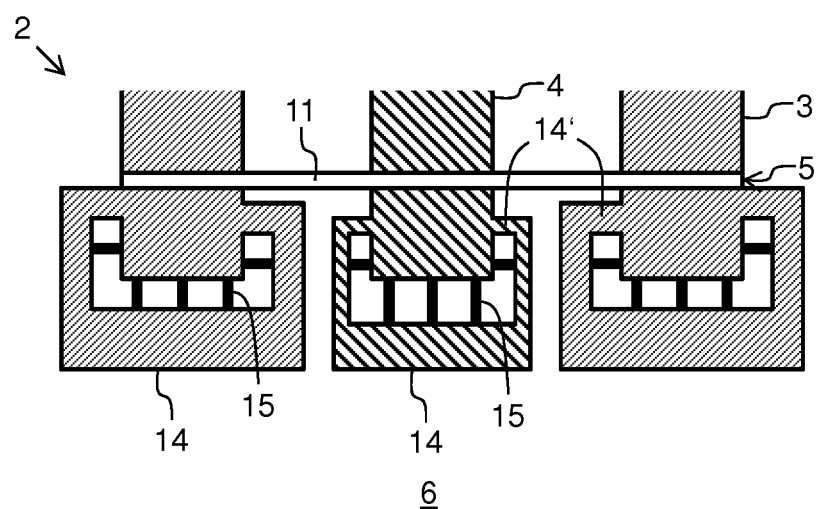
FIG. 4 a partial view of a third exemplary embodiment of an inventive sensor housing having a thermal protection element in cross section.

FIG. 4 shows a third exemplary embodiment of the inventive sensor housing 2 having a thermal protection element 14, in particular for use in a combustion chamber, which is arranged on the side of the metal sheet 11 facing the pressure chamber 6, in particular a combustion chamber. The thermal protection element 14 is preferably produced during the additive manufacturing of the sensor housing 3 and the membrane stamp 4 and is thereby materially bonded to the sensor housing 3 and the membrane stamp 4.

The thermal protection element 14 is configured, in particular formed, such that it at least partially shields in particular the membrane 11, but preferably also the sensor body 3 and/or the membrane stamp 4, from heat from the pressure chamber 6, in particular a combustion chamber. As schematically depicted, it thereby at least partially projects from the membrane yet allows pressure from the pressure chamber 6 to act on the membrane 11.

It is advantageous to prevent the influx of heat into the sensor body 3 and/or the membrane stamp 4 and/or the metal sheet 5 or membrane 11 respectively since the expansion, warping and/or distortion associated with heat influx affect the elastic properties of in particular the membrane 11 and thus the measuring characteristic of the pressure sensor 1. In particular, such an unwanted influx of heat can cause the membrane 11 to deform to a greater or lesser extent at a given pressure or the membrane stamp 4 to respectively be deflected to a greater or lesser extent. The electrical signal generated by the pressure transducer is thus distorted; i.e. is correspondingly stronger or not as strong.

The thermal protection element 14 is in particular connected to the sensor body 3 and the membrane stamp 4 by connecting means 15. The connecting means 15, which can for instance be configured as webs or bars, are preferably thermoconductive so that the heat absorbed by the thermal protection element 14 from the pressure chamber 6 can be dissipated to the sensor housing 3 and/or the membrane stamp 4 via said connecting means 15 and particularly preferentially expelled there by a coolant via cooling ducts. Preferentially, the connecting means 15 are of elastic configuration; i.e. mechanically flexible, so that heat-related deformations, distortions and/or warping of the thermal protection element 14 do not transfer to the sensor body 3 and/or the membrane stamp 4.

The thermal protection element 14 is preferably configured to expand along its surface, particularly in the radial direction, when exposed to heat. The preferentially elastic connecting means 15 thereby deform, in particular warp. Alternatively or additionally, the thermal protection element 14 is configured to expand perpendicular to its surface, particularly in the axial direction, when exposed to heat, whereby the preferentially elastic connecting means deform, in particular warp.

As FIG. 4 depicts, the thermal protection element 14 is preferentially substantially connected symmetrically to the sensor body 3 and/or the membrane stamp 4, particularly to projections of same arranged on the pressure chamber side and in particular projecting into the pressure chamber 6, particularly at connection points 14'. The forces, in particular tractive forces, on the sensor body 3 and/or membrane stamp 4 caused by the expansion of thermal protection element 14 thereby radially strike the sensor body 3 and/or the membrane stamp 4 on both sides via the connection points 14' and cancel each other out without causing a deformation and/or distortion and/or warping of the sensor body 3 and/or the membrane stamp 4 and thereby impacting the elastic properties of the membrane 11 or the measuring characteristic of the pressure sensor 1 respectively.

Alternatively to the embodiment shown in FIG. 4, it is also possible for the thermal protection element to be arranged only on the sensor body 3 and/or the membrane stamp 4.

Figure 5:
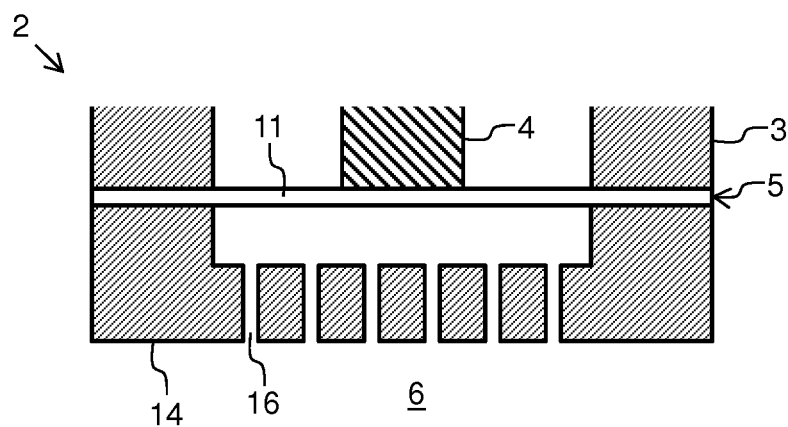
FIG. 5 a partial view of a fourth exemplary embodiment of an inventive sensor housing having a thermal protection element in cross section.

FIG. 5 shows a fourth exemplary embodiment of the inventive sensor housing 2 with a thermal protection element 14.

In this exemplary embodiment, the thermal protection element 14 spans the metal sheet 5, in particular the membrane 11, like a bridge. In particular, the thermal protection element 14 substantially covers the entire side of the sensor housing 2 facing the pressure chamber 6. Preferably, the thermal protection element 14 is thereby connected to the sensor body 3, in particular additively manufactured with same. Further preferably, the thermal protection element 14 is thereby particularly of solid configuration so as to be able to absorb heat from the pressure chamber 6, in particular a combustion chamber, particularly well. In order to enable pressure from the pressure chamber 6, in particular a combustion chamber, to act on the membrane 11, the thermal protection element 14 exhibits holes 16 or slots arranged in particular in the axial direction.

Figure 6:
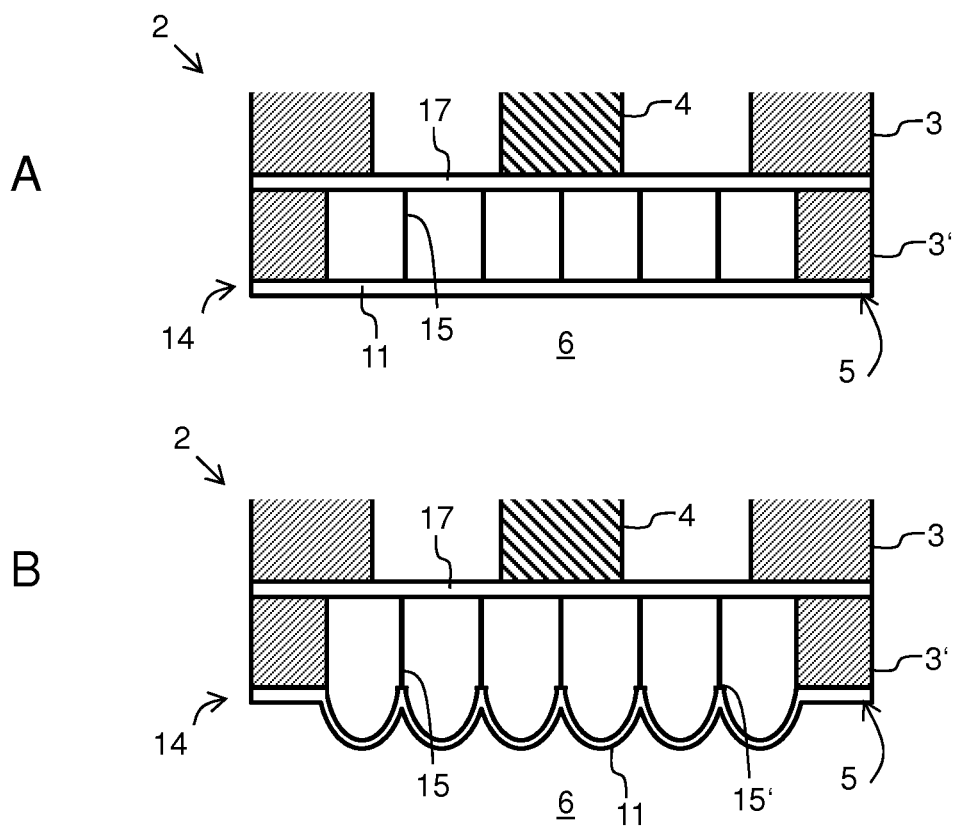
FIG. 6 partial views of two alternatives of a fifth exemplary embodiment of an inventive sensor housing having a thermal protection element in cross section.

FIG. 6 shows a exemplary embodiment of the inventive sensor housing 2 with a thermal protection element 14.

In this exemplary embodiment, the thermal protection element 14 is formed by the metal sheet 5 which in this exemplary embodiment is in particular a metal foil.

The membrane 11 is preferably supported by a supporting structure 17. The supporting structure 17 can thereby preferably be configured as a mesh or a perforated plate and is in contact with or materially bonded to the membrane stamp 4.

Like the metal sheet 5, the supporting structure is also materially and flatly bonded to the sensor body 3 and/or a projection 3' of the sensor body 3 arranged on the pressure chamber side, in particular projecting into the pressure chamber 6, preferably during the additive manufacturing.

In addition, the supporting structure is preferably materially bonded in particular to the metal sheet 5, particularly membrane 11, by in particular additively manufactured connecting means 15.

The connecting means 15 in this exemplary embodiment are of rigid and thermally non-conductive configuration so that heat absorbed by the membrane 11 cannot be released, or only to a limited extent, to the supporting structure 17.

FIG. 6A shows the thermal protection element 14 in a first, in particular relaxed, state of no or only little heat absorption. The membrane 11 thereby forms a substantially flat surface and is arranged substantially parallel to the supporting structure.

The membrane 11 is thus configured to absorb heat from the pressure chamber 6 and thereby expand along its surface, in particular in the radial direction. In particular, the membrane 11 thereby assumes a waved or curving shape.

FIG. 6B shows the thermal protection element 14 in an activated state of having absorbed heat, in particular after a thermal shock. Due to the low thickness of the membrane 11, in particular the metal foil, and the connection to the rigid connecting means 15, the membrane 11 deforms when axially expanding along its surface. In particular, the membrane 11 assumes a waved, ached or curved shape, wherein the crosspoints of the waves, arches or curves are at the connecting points 15' of the connecting means 15. The connecting means 15 thus exerts or transfers no force to the supporting structure 17 such that a deformation, warping and/or distortion of the supporting structure 17 and thus an influencing of the measuring characteristic of the pressure sensor 1 is prevented.

Figure 7:
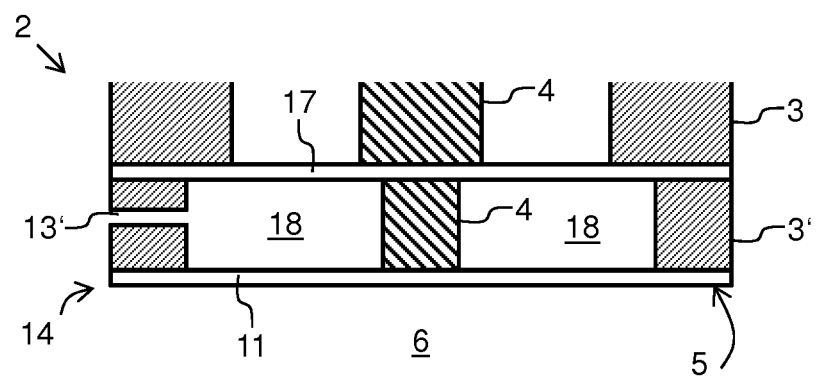
FIG. 7 a partial view of a sixth exemplary embodiment of an inventive sensor housing having a thermal protection element in cross section.

FIG. 7 shows a sixth exemplary embodiment of the inventive sensor housing 2 having a thermal protection element 14.

In this exemplary embodiment as well, the thermal protection element 14 is formed by the metal sheet 5, in particular a metal foil, and spans the supporting structure 17 like a bridge. In particular, the membrane 11 covers a side of the sensor housing 2 facing the pressure chamber 6. Preferably, an extension 4' of the membrane stamp 4 in this exemplary embodiment connects the supporting structure 17 to the membrane 11.

The supporting structure 17 is materially and flatly bonded to the sensor body 3 and the membrane stamp 4, in particular by the additive manufacturing of the sensor body 3 and/or the membrane stamp 4.

A coupling medium 18, preferably a coolant, is arranged between the metal sheet 5, in particular the membrane 11, and the supporting structure 17, which in the present case is at least liquid-tight. In particular, the metal sheet 5, in particular the membrane 11, and the supporting structure 17 sandwich the coupling medium 18. The coupling medium 18 provides an operative connection between the metal sheet 5, in particular the membrane 11, and the supporting structure 17 in the axial direction.

The membrane 11 is configured to absorb heat from the pressure chamber 6 and relay it to the coupling medium 18, which expands due to the influx of heat. Since the coupling medium 18 is rigidly limited in the radial direction by the sensor body 3 and the membrane stamp 4' and elastically limited in the axial direction by the membrane 11 and the supporting structure 17, the membrane 11 and the supporting structure 17 thereby deform symmetrically; i.e. oppositely. In particular, the supporting structure 17 is deflected toward the interior of the sensor body 3; i.e. to the side facing away from the pressure chamber 6, while the membrane 11 is deflected toward the pressure chamber 6; i.e. to the side facing the pressure chamber 6.

Preferably, the elastic properties of the membrane 11 and the support structure 17 are equal such that there is equal opposite deflection in the membrane 11 and the support structure 17.

Alternatively or additionally, the coupling medium 18 conducts the absorbed heat on to the supporting structure 17 such that there is equal opposite deflection in the membrane 11 and the support structure 17. The force acting on the membrane stamp 4 due to the deflections of the membrane 11 and the supporting structure 17 are thus compensated; i.e. a deflection of the membrane stamp 4 by the effect of heat, in particular from a thermal shock, is prevented.

Preferably, the sensor body 3 comprises at least one further access channel 13' which is arranged between the metal sheet 5 and the further membrane 17. The coupling medium 18, in particular a coolant, can be conducted between the metal sheet 5, in particular the membrane 11, and the further membrane 17 via said further access channel 13' and/or drained from there. Preferably, the further access channel 13' is produced during the additive manufacturing of the sensor body 3.

Figure 8:
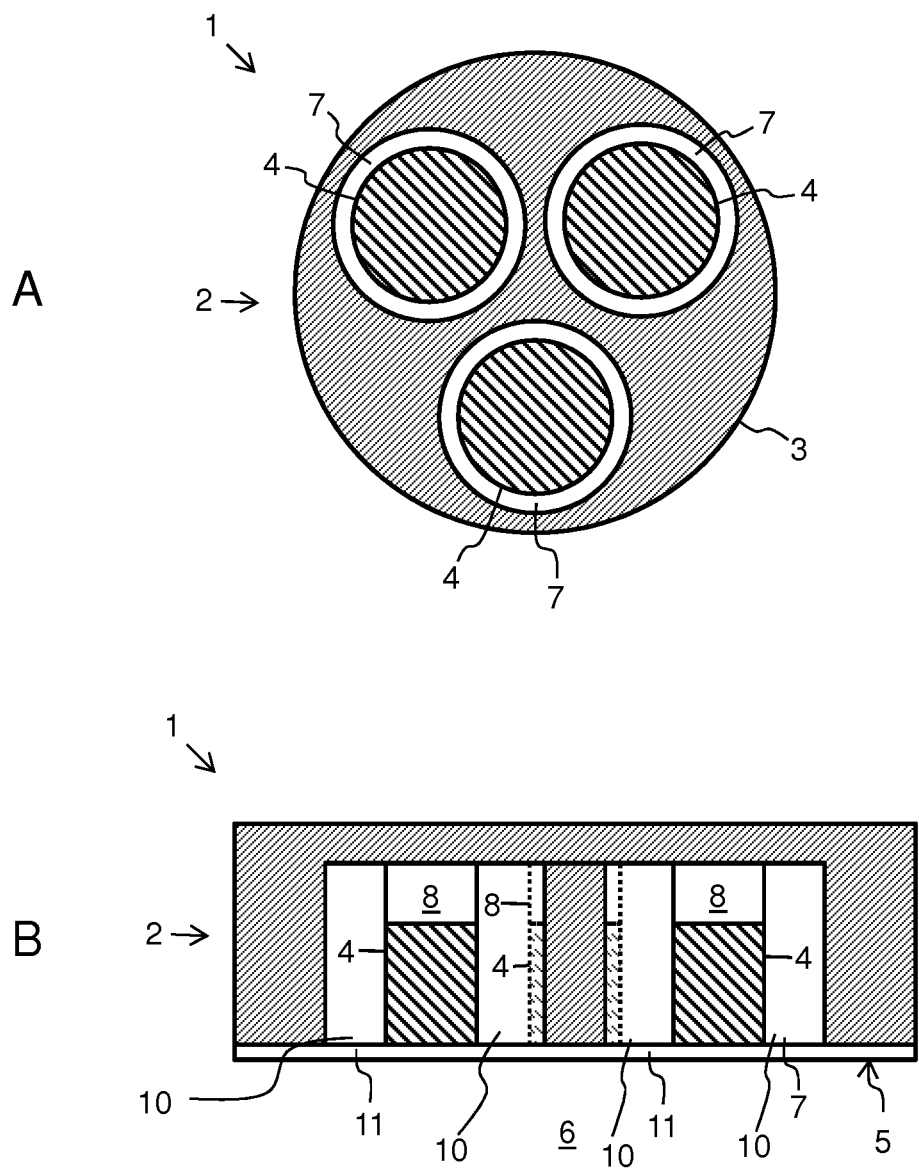
FIG. 8 a pressure sensor having a seventh exemplary embodiment of an inventive sensor housing in top plan view and in cross section.

FIG. 8 shows a seventh exemplary embodiment of a pressure sensor 1 having an inventive sensor housing 2, in particular for use in a combustion chamber.

The sensor body 3 is applied to the metal sheet 5 by means of additive manufacturing such that three membrane stamps 4 can be arranged in the sensor body 3, in particular produced during the additive manufacturing or applied to the metal sheet 5 respectively. Accordingly, the sensor housing 2 in this exemplary embodiment exhibits three pressure transducers 8, each operatively connected to a membrane stamp 4.

FIG. 8A shows the seventh exemplary embodiment of the inventive sensor housing 2 of a pressure sensor 1 in a top plan view from the pressure chamber. For the sake of clarity, the metal sheet, which closes the three openings 10 of the sensor body 3 to the pressure chamber 6, is not shown.

The three gaps 7 between each of the three membrane stamps 4 and the sensor body 3 are clearly visible in the top plan view. The not-depicted metal sheet forms in each case a membrane at the three openings 10 between the sensor body 3 and the three membrane stamps 4 so that the three membrane stamps 4 are in particular mounted so as to be axially movable independently of each other and thereby be able to absorb a pressure acting on the respective membrane or be able to transmit or release it to a respective pressure transducer respectively.

FIG. 8B shows the seventh exemplary embodiment of the inventive sensor housing 2 of a pressure sensor 1 in a cross section perpendicular to the top plan view. A membrane stamp 4 as well as a pressure transducer 8, which do not lie in the sectional plane, are depicted therein by dashed lines.

The openings 10 of the sensor body 3 are closed to the pressure chamber 6 by the metal sheet 5 which in each case forms a membrane 11 between the sensor body 3 and each membrane stamp 4. Each membrane stamp 4 is operatively connected to a pressure transducer 8 such that a pressure-induced deformation, in particular deflection, of the membrane 11 connected to the membrane stamp 4 triggers the generating of an electrical signal proportional to the pressure acting on the membrane 11.

With a sensor housing 2 having three or also two or more pressure transducers 8, membrane stamps 4 and membranes 11 arranged in or on a sensor body 3, pressure measurement in a pressure chamber 6 by a corresponding pressure sensor 1 provides three or also two or more electrical signals. This redundancy enables the control and/or monitoring of the individual pressure transducers 8, resulting in more reliable pressure measurement.

Figure 9:
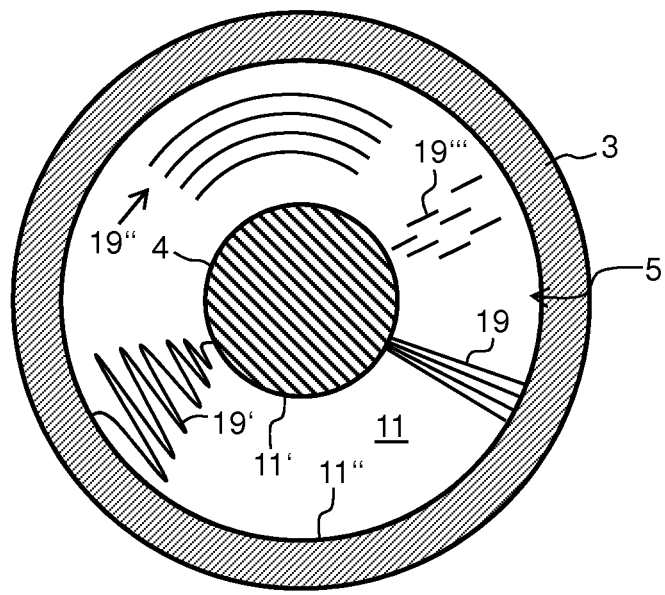
FIG. 9 an eighth exemplary embodiment of an inventive sensor housing in top plan view.

FIG. 9 shows an eighth exemplary embodiment of an inventive sensor housing 2 in top plan view. The metal sheet 5 is materially and flatly bonded to the sensor body 3 and the membrane stamp 4 by additive manufacturing in the shaded areas.

The metal sheet 5 forms a membrane 11 between the sensor body 3 and the membrane stamp 4.

The metal sheet 5, in particular membrane 11, comprises membrane structures 19-19" for heat absorption and/or heat dissipation. Alternatively or additionally, the membrane structures 19-19" are configured to influence the elastic properties of the membrane 11, in particular strengthen the membrane 11. The membrane structures 19-19" run particularly linearly, in approximate straight lines or in serpentine fashion, on the surface of the membrane 11. Preferably, the membrane structures 19-19" are applied and materially bonded to the metal sheet 5, in particular the membrane 11, during the additive manufacturing of the sensor body 3 and/or the membrane stamp 4. In particular, the membrane elements 19-19", like the metal sheet 5, particularly the membrane 11, are formed as materially bonded metal strips and preferably configured to radially dissipate absorbed heat to the sensor body 3, where the heat is preferentially absorbed and dissipated by a coolant within cooling ducts.

In a first implementation, the membrane structures 19 run in the radial direction, particularly in fan-like manner, in particular from an inner edge 11' of the membrane to an outer edge 11" of the membrane.

In a second implementation, the membrane structures 19' run in wave-like manner, in particular in the radial direction, in particular from an inner edge 11' of the membrane to an outer edge 11" of the membrane.

In a third implementation, the membrane structures 19" run circularly and/or semi-circularly around the inner edge 11' of the membrane.

In a fourth implementation, the membrane structures 19" run in the radial direction, particularly at the same or differing lengths, in particular in random distribution.

Figure 10:
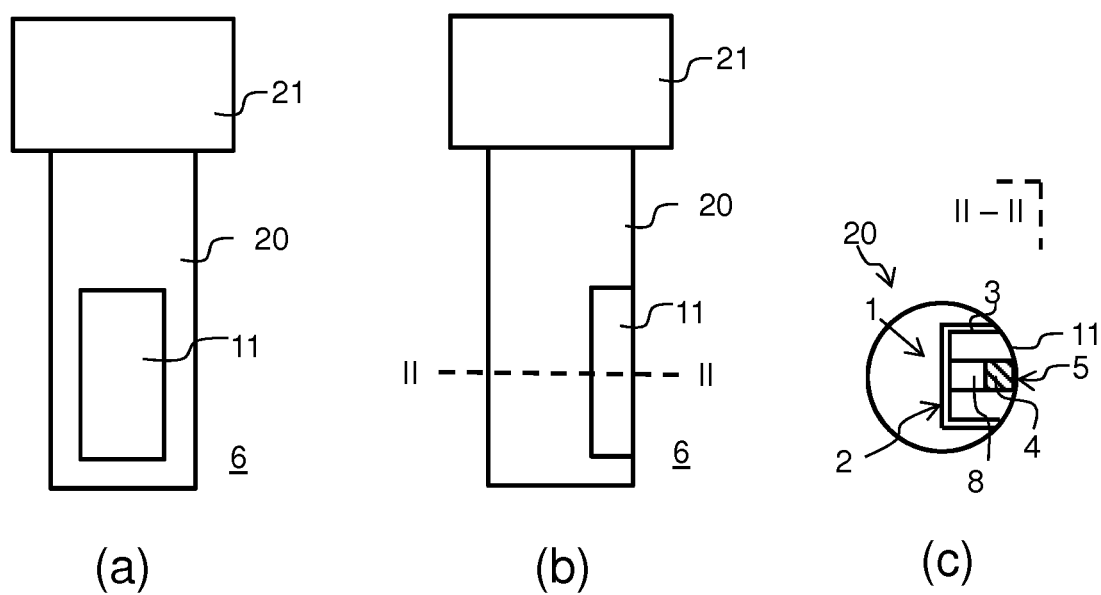
FIG. 10 different views of a probe equipped with a sensor exhibiting a ninth exemplary embodiment of the inventive sensor housing.

FIG. 10 shows different views of a probe 20 equipped with a sensor 1 exhibiting a ninth exemplary embodiment of the inventive sensor housing 2.

FIGS. 10a and 10b are each side views of a probe 20 rotated 45° with respect to an axis of the probe 20. FIG. 10c shows a cross section through the probe 20 in the II-II plane as per FIG. 10b.

When pressure measuring sensors, such as for example the pressure sensor 1 shown in FIG. 1, are installed, e.g. in an internal combustion engine, in order to measure the cylinder pressure, the membrane 11 is usually arranged, as is shown in FIG. 1, at the end of the pressure sensor 1 which is brought to the measuring point, for example in the combustion chamber. Typically, a pressure sensor 1 as per FIG. 1 is thereby secured, in particular screwed into, a bore in the engine block. It makes sense in this case for the pressure sensor 1 to be round so as to achieve optimal spatial efficiency.

Utilizing additive manufacturing, however, enables the realization of sensor shapes and/or sensor housing shapes which are not axially symmetrical. Particularly able to be realized, as is evident from FIGS. 10a and 10b, are rectangular sensor housings 2 with likewise rectangular membranes 11.

In principle, all the exemplary embodiments of the inventive sensor housing 2 can thus provide for the sensor housing 2 to exhibit an angular, in particular rectangular, outer counter. In this case, the membrane 11, which is supported by the sensor body 3, can also exhibit a rectangular shape.

This has the advantage of the sensor housing 2 being able to expand farther in one spatial direction having a lot of space than in another spatial direction. Because of the greater expansion of the membrane 11 and the thereby associated larger surface, a pressure sensor 1 provided with such a membrane 11 exhibits higher sensitivity. In particular, such a rectangular sensor housing 2 or rectangular sensor 1 respectively can be introduced, for example into a combustion chamber 6, by way of a relatively small mounting hole.

For example, such a pressure sensor 1 can be arranged on the side of a probe 20, as is shown for example in the applicant's AT 407 577 B, in which the pressure sensor is integrated into a spark plug which in this case serves as probe 20 (see hereto in particular FIG. 3 of AT 407 577 B). A pressure sensor connected to a spark plug in a spark plug hole is thereby introduced into the combustion chamber of an internal combustion engine. Due to its rectangular shape, the membrane of the pressure sensor 1 thereby exhibits a substantially enlarged surface.

A pressure sensor 1 having an inventive sensor housing 2 can also be e.g. laterally arranged on a probe 20 in the manner as depicted in FIGS. 10a, 10b and 10c from different perspectives.

Additionally, a membrane 11 can also be curved along a spatial direction as shown in FIGS. 10b and 10c. As a generalization, non-rotationally symmetric membrane shapes can be realized.

Due to the rectangular shape, the pressure sensor 1 or its membrane 11 respectively exhibits a substantially enlarged effective area and thus a higher sensitivity. By being arranged in a probe 20, as shown in FIG. 10, or in probe combined with a spark plug, as shown in FIG. 3 of AT 407 577 B, the mounting hole can be kept very small. The probe 20 is inserted into the mounting hole and screwed by way of the probe socket 21 into a motor housing or the respective application to be measured.

The pressure sensor 1 is preferably inserted into the probe 20 from the side and secured therein, for example by a screw connection or other joining technique.

Of course, other sensor/sensor housing shapes and membrane shapes are also possible. In particular, the metal sheet 5 can be repeatedly waved or even exhibit a different structure substantially running only along one spatial direction.

The above-described exemplary embodiments are merely examples which are in no way to limit the protective scope, application or design of the invention. Rather, the preceding description affords one skilled in the art a guideline for the implementation of at least one exemplary embodiment, whereby various modifications can be made, in particular with regard to the function and arrangement of the described components and feature combinations of various exemplary embodiments, without departing from the protective scope as results from the claims and these equivalent feature combinations.

LIST OF REFERENCE NUMERALS 1 sensor
2 sensor housing
3 sensor body
4 membrane stamp
5 metal sheet
5'a,5'b first, second outer edge
5"a,5"b first, second inner edge
6 pressure chamber
7 gap
8 pressure transducer
9 integral joint
10 sensor body opening
11 membrane
12 cavity
13 access channel
13' further access channel 14 thermal protection element
14' connection point
15 connecting means
15' connecting point
16 hole
17 further membrane
18 coupling medium
19, 19', 19", 19''' membrane structure
20 probe
21 probe socket

The invention claimed is:

1. A sensor housing for a force or pressure sensor, particularly for use in a combustion chamber, comprising:
   a metallic sensor body; and
   a metal sheet produced by a separating process or a forming process which closes off the metallic sensor body on one side;
wherein the metallic sensor body is applied to the metal sheet by additive manufacturing and connected to the metal sheet by a first integral joint produced during the additive manufacturing, and wherein the metal sheet forms a membrane in a region bounded by the metallic sensor body.

2. The sensor housing according to claim 1, further comprising:
   at least one metallic membrane stamp in contact with the metal sheet;
wherein the membrane is formed between the metallic sensor body and the at least one metallic membrane stamp.

3. The sensor housing according to claim 2, wherein the at least one metallic membrane stamp is applied to the metal sheet by the additive manufacturing and connected to the metal sheet by a second integral joint.

4. The sensor housing according to claim 2, wherein the metal sheet, the metallic sensor body, or the at least one metallic membrane stamp comprise different materials.

5. The sensor housing according to claim 3, wherein the metal sheet comprises a rigid section where the metal sheet connects to the metallic sensor body and/or the at least one metallic membrane stamp by means of the first or second integral joint and a flexible section in the area of the membrane.

6. The sensor housing according to claim 2, wherein the metallic sensor body and/or the at least one metallic membrane stamp comprise at least one cooling duct which is formed during the additive manufacturing of the metallic sensor body and/or the at least one metallic membrane stamp.

7. The sensor housing according to claim 6, wherein the at least one cooling duct is configured in correspondence with a shape of the metallic sensor body or the at least one metallic membrane stamp, and runs at least substantially parallel to the metal sheet.

8. The sensor housing according to claim 6, wherein the at least one cooling duct runs in a spiral within the metallic sensor body or the at least one metallic membrane stamp.

9. The sensor housing according to claim 2, further comprising a thermal protection element which is integrally bonded to the metallic sensor body and/or the at least one metallic membrane stamp by additive manufacturing and arranged on a side of the metallic sensor body, the at least one metallic membrane stamp, or the membrane able to face a pressure chamber.

10. The sensor housing according to claim 9, wherein the thermal protection element is materially and/or thermoconductively connected to the metallic sensor body or the at least one metallic membrane stamp in operative connection by means of an additive-manufactured connecting means.

11. The sensor housing according to claim 1, wherein the membrane together with at least one section of the metallic sensor body forms a thermal protection element, further comprising:
   a supporting structure, wherein the metal sheet is operatively connected to the supporting structure in a region of the membrane by means of a rigid connecting means or a coupling medium.

12. The sensor housing according to claim 10, wherein the operative connection acts exclusively in a radial direction of the sensor housing.

13. The sensor housing according to claim 12, wherein a supporting structure is in contact with the least one metallic membrane stamp.

14. The sensor housing according to claim 11, wherein the metallic sensor body and/or at least one metallic membrane stamp are applied to the supporting structure by the additive manufacturing and connected to the supporting structure by a third integral joint.

15. The sensor housing according to claim 1, wherein the metal sheet and/or a supporting structure closes the sensor housing, so as to be gas-tight.

16. The sensor housing according to claim 1, comprising at least two membrane stamps and at least one pressure transducer, wherein the metal sheet forms at least two membranes between the metallic sensor body and the at least two membrane stamps.

17. The sensor housing according to claim 1, wherein the metal sheet exhibits heat-conducting and/or reinforcing membrane structures in a region of the membrane which are materially connected to the metal sheet by a fourth integral joint.

18. The sensor housing according to claim 1, wherein the sensor housing exhibits an angular cross section in an axial direction, wherein the membrane at least substantially exhibits the form of the cross section.

19. The sensor housing according to claim 1, wherein the metal sheet exhibits, at least in a region of the membrane, a curvature which is not rotationally symmetrical with respect to a longitudinal axis of the sensor housing.

20. A pressure sensor or a force sensor having a sensor housing according to claim 1 and a pressure transducer, wherein the pressure transducer is arranged within the metallic sensor body and designed to convert a pressure or a force recorded by at least one metallic membrane stamp into an electrical signal.

21. The use of an additive manufacturing apparatus for producing a sensor housing of a force or pressure sensor according to claim 1.

22. The sensor housing according to claim 1, wherein the membrane has an annular shape.

23. The sensor housing according to claim 1, wherein one or more integral joints are planar.

24. The sensor housing according to claim 1, wherein the metal sheet is produced by turning or by forging.

25. The sensor housing according to claim 1, wherein the metal sheet is a flat or a thin substantially planar metal piece.

26. The sensor housing according to claim 1, wherein the metal sheet is a metal foil.

27. The sensor housing according to claim 1, wherein the metal sheet includes at least a partial waved configuration, curved configuration, or arched configuration substantially in a radially extending plane.

28. The sensor housing according to claim 1, wherein the metal sheet has a lower membrane thickness than the supporting structure so that the membrane absorbs more acting heat than the supporting structure.

29. The sensor housing according to claim 1, wherein the metal sheet comprises the membrane stamp and wherein the metal sheet is integrally formed with the membrane stamp.

30. The sensor housing accordingly to claim 29, wherein the metal sheet is integrally formed with the membrane stamp by means of a separating process, by turning, or by electrochemical machining (ECM).

31. A method for producing a sensor housing for a force or pressure sensor, comprising the steps:
 providing a metal sheet produced by a separating process or a forming process; and
 applying a sensor body and/or at least one membrane stamp to the metal sheet by means of additive manufacturing, wherein the additive manufacturing produces an integral joint between the sensor body and the at least one membrane stamp or the metal sheet.

32. The method according to claim 31, wherein the metal sheet is at least partially melted onto at least one surface during the additive manufacturing.

33. The method according to claim 31, wherein at least one cavity is formed in the sensor body and/or the at least one membrane stamp during the additive manufacturing.

34. The method according to claim 33, further comprising the following step:
 removing residues produced during the additive manufacturing from the at least one cavity via a bore or an access channel formed during the additive manufacturing.

35. The method according to claim 31, wherein the integral joint is planar.

* * * * *